(12) United States Patent
Lin et al.

(10) Patent No.: US 11,874,144 B2
(45) Date of Patent: Jan. 16, 2024

(54) DISPLACEMENT MEASUREMENT SYSTEM

(71) Applicant: Li Lin, Wilmington, DE (US)

(72) Inventors: Li Lin, Wilmington, DE (US); Tai Tylor Lin, Wilmington, DE (US)

(73) Assignee: Li Lin, Wilmington, DE (US)

( * ) Notice: Subject to any disclaimer, the term of this patent is extended or adjusted under 35 U.S.C. 154(b) by 58 days.

(21) Appl. No.: 16/940,636

(22) Filed: Jul. 28, 2020

(65) Prior Publication Data

US 2022/0034686 A1 Feb. 3, 2022

(51) Int. Cl.
*G01D 5/347* (2006.01)
*G01D 5/249* (2006.01)

(52) U.S. Cl.
CPC ........... *G01D 5/347* (2013.01); *G01D 5/2497* (2013.01)

(58) Field of Classification Search
CPC .. G01D 5/347; G01D 5/2497; G01D 5/34792; G01D 5/34715; G01D 5/266; G01D 2205/90; G01D 5/264; G01D 5/34707
See application file for complete search history.

(56) References Cited

U.S. PATENT DOCUMENTS

| 4,293,944 | A | * | 10/1981 | Izumita | G11B 7/0953 369/44.42 |
| 4,802,153 | A | * | 1/1989 | Kataoka | G11B 7/08552 |
| 5,218,199 | A | * | 6/1993 | Miller | G01D 5/34715 250/214 PR |
| 5,485,438 | A | * | 1/1996 | Koyama | G11B 11/10532 369/111 |
| 5,811,789 | A | * | 9/1998 | Nix | G11B 7/0945 |
| 5,905,708 | A | * | 5/1999 | Richter | G11B 7/127 369/44.37 |
| 5,965,879 | A | * | 10/1999 | Leviton | G01D 5/34792 250/231.13 |
| 6,366,047 | B1 | * | 4/2002 | Horwitz | G01D 5/2497 318/567 |
| 6,664,535 | B1 | * | 12/2003 | Nahum | G01D 5/34792 356/617 |
| 6,781,694 | B2 | * | 8/2004 | Nahum | G01D 5/34776 235/494 |
| 6,867,412 | B2 | * | 3/2005 | Patzwald | G01D 5/2455 356/617 |
| 6,963,409 | B2 | * | 11/2005 | Benner | G01D 5/34715 250/237 G |
| 7,186,969 | B2 | * | 3/2007 | Shimomura | G01D 5/36 250/237 G |

(Continued)

*Primary Examiner* — Mohamed K Amara
(74) *Attorney, Agent, or Firm* — Maier & Maier, PLLC

(57) ABSTRACT

A displacement measuring system is disclosed. The system may implement a code carrier formed from a data storage medium which includes a relative displacement measurement code channel which is an arrangement of pit lines and bump lines. A composite subsystem may include an optical laser assembly, a signal processing unit, and a power driver, and can scan and decode the code carrier by focusing a laser beam on the code carrier and obtaining a group of radio frequency electric signals from the reflection of the laser beam which represents the bumps and pits of the code carrier. A central control and signal output unit can process the electric signals produced by multiple composite subsystems and output information representing incremental and absolute displacement.

24 Claims, 13 Drawing Sheets

(56) References Cited

U.S. PATENT DOCUMENTS

| | | | | |
|---|---|---|---|---|
| 7,292,312 | B2* | 11/2007 | Loopstra | G03F 9/7011 355/75 |
| 7,295,324 | B2* | 11/2007 | Jones | G01B 11/002 356/498 |
| 7,307,736 | B2* | 12/2007 | Tobiason | G01D 5/262 356/614 |
| 7,368,705 | B2* | 5/2008 | Hare | G01D 5/2458 250/231.13 |
| 8,488,106 | B2* | 7/2013 | Shibazaki | G03F 7/70775 355/75 |
| 8,493,569 | B2* | 7/2013 | Kapner | G01D 5/38 356/499 |
| 8,599,359 | B2* | 12/2013 | Shibazaki | G03F 7/70775 355/72 |
| 8,760,629 | B2* | 6/2014 | Shibazaki | G03F 7/70483 355/72 |
| 8,773,635 | B2* | 7/2014 | Shibazaki | G03F 7/70341 355/72 |
| 8,860,925 | B2* | 10/2014 | Shibazaki | G03F 7/70758 355/75 |
| 8,902,402 | B2* | 12/2014 | Shibazaki | G03F 7/70775 355/72 |
| 9,029,757 | B2* | 5/2015 | Tobiason | G01D 5/34792 250/231.13 |
| 9,080,899 | B2* | 7/2015 | Tobiason | G01D 5/34794 |
| 9,127,967 | B2* | 9/2015 | Nagura | G01D 5/34746 |
| 9,200,928 | B2* | 12/2015 | Yonezawa | G01D 5/34715 |
| 9,228,857 | B2* | 1/2016 | Shigeta | G01D 5/24466 |
| 9,335,185 | B2* | 5/2016 | Yoshida | H02K 11/22 |
| 9,435,667 | B2* | 9/2016 | Shigeta | G01D 5/34776 |
| 9,470,880 | B2* | 10/2016 | Suzuki | G01D 5/34794 |
| 9,574,910 | B2* | 2/2017 | Yonezawa | G01D 5/2452 |
| 9,778,035 | B2* | 10/2017 | Nagura | G01D 5/34707 |
| 9,958,792 | B2* | 5/2018 | Shibazaki | G03F 7/7085 |
| 10,859,410 | B2* | 12/2020 | Yoshimuta | G01D 5/34746 |
| 2004/0200957 | A1* | 10/2004 | Teng | G01D 5/34707 250/231.13 |
| 2004/0263846 | A1* | 12/2004 | Kwan | G03F 9/7053 356/399 |
| 2006/0284062 | A1* | 12/2006 | Altendorf | G01D 5/34715 250/231.13 |
| 2007/0131853 | A1* | 6/2007 | Chua | G01D 5/34715 250/231.13 |
| 2010/0328681 | A1* | 12/2010 | Kapner | G01D 5/34715 356/616 |
| 2013/0026351 | A1* | 1/2013 | Ishizuka | G01D 5/34707 359/839 |
| 2013/0112859 | A1* | 5/2013 | Shaffer | G01D 5/34715 250/231.1 |
| 2014/0064565 | A1* | 3/2014 | Nagura | G01D 5/34707 382/106 |
| 2015/0076332 | A1* | 3/2015 | Nagura | G01D 5/34784 250/231.13 |
| 2016/0061636 | A1* | 3/2016 | Gowreesunker | G01D 5/34715 250/201.1 |
| 2016/0180516 | A1* | 6/2016 | Nagura | G06T 7/70 382/103 |
| 2016/0209247 | A1* | 7/2016 | Nagura | G01D 5/34715 |
| 2016/0341576 | A1* | 11/2016 | Hickman MaCcoy | G01D 5/38 |
| 2016/0363464 | A1* | 12/2016 | Kato | G01D 5/34746 |
| 2018/0136447 | A1* | 5/2018 | Ando | G01D 5/347 |
| 2018/0172483 | A1* | 6/2018 | Geiger | G01D 5/3473 |
| 2018/0367726 | A1* | 12/2018 | Sasaki | G01D 5/34715 |
| 2019/0265077 | A1* | 8/2019 | Tobiason | G01D 5/34707 |

* cited by examiner

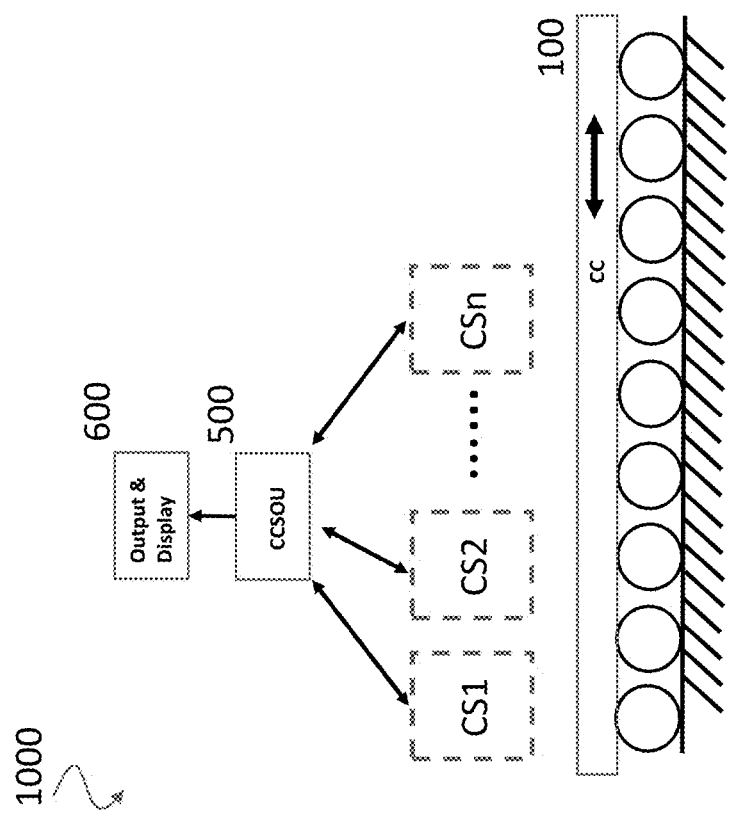

DISPLACEMENT MEASUREMENT SYSTEM

BACKGROUND

According to technical principles, long-range displacement sensors with high precision can be divided into major types of optical grating, magnetic grating, capacitive grating, ball (spherical) grating, inductosyn, and time grating. These sensors can be also divided into linear displacement sensors and angular displacement sensors based on application, or relative measurement and absolute measurement types based on output information. Among all these types, optical grating technology is the most widely used, because of its ultra-high signal-converting rate, ultra-high resolution and precision, and outstanding performance against magnetic interference, which are unmatchable by other types.

The optical measurement signal of the current technology is formed by light diffraction and sensing the interference through fine grating. To obtain the signal, four major components are required in a measurement system: light source, mask grating for diffraction, measuring grating, and photovoltaic (PV) signal-converting unit. The line width and spacing of the gratings ranges in a few to a few tens of micrometers. Usually, the light source, mask grating and PV unit are fixed on a frame, and the measuring grating is installed on another frame to perform a relative motion with respect to the referent frame. To accomplish high-precision measurement, high accuracies of fabrication and installation are necessary, which leads to expensive production.

In order to meet modern needs of social progress and development, digital storage technology has made many major breakthroughs in the past 40 years. The current digital storage technologies primarily include magnetic storage, optical storage, and solid-state storage. Due to physical principles, these technologies have their own advantages and disadvantages, and development space. The magnetic storage is subject to local magnetic property variations in terms of N/S polarity to record information. Hard disk technology is a typical application of magnetic storage. The current storage capacity of hard disk technology is ten terabytes (TB), which is equivalent to 8-nanometers spacing between two information units.

Optical digital storage changes the local optical characteristics (light transmission, reflection and astigmatism) of the information carrier to record information. Typical applications of optical disc technologies are CD (compact disc), DVD (digital versatile disc), and BD (Blu-ray Disc). Mass production of optical discs is accomplished by pressing an original master version of the disc onto polycarbonate plastic discs to form pits and lands. Pits are small grooves pressed into the disc's substrate, and lands are areas of the disc where no imprint resulted. Pits and lands have different properties of reflectivity, and a PV detector picks up the change due to interaction of the differences and decodes the change into digital information. The finest spacing between the two information units (pints or lands) is about 800 nm for a CD, 400 nm for a DVD, and 150 nm for a BD. These fine spaces are much finer than gratings of currently existing sensors. CDs, DVDs and BDs have been used to store all types of data, including songs, movies, software, and all kinds of information since their conception. These optical digital storage methods have become increasingly obsolete in the personal computer and consumer electronic market due to the growth of other technologies and the internet. Some superior technologies for data storage can be further developed for applications in displacement measurement.

SUMMARY

A displacement measuring system based on optical storage technologies is shown and described. The system may implement displacement measurement on a code carrier formed from a data storage medium which includes a relative displacement measurement code channel which is an arrangement of pit lines and bump lines. A composite subsystem may include an optical laser assembly, a signal processing unit, and a power driver. The optical laser assembly may include a laser diode, an objective lens, coil actuators, and a photo detector with multi photodiodes or light sensitive elements. The composite subsystem can scan and decode the code carrier by focusing a laser beam emitted from the laser diode onto the reflective bumps and pits of the code carrier and reading the reflection of the laser beam using the objective lens and the photo detector. The reflection of the laser beam forms a group of high frequency RF signals which represents the bumps and pits of the code carrier. A central control and signal output unit can process the electric signals produced by multiple composite subsystems and output information representing displacement measured.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 4b is an exemplary top view of the exemplary embodiment shown in FIG. 4a.

FIG. 6 is an exemplary diagram illustrating a displacement measurement system which comprises multiple composite subsystems (CSs).

DETAILED DESCRIPTION

Figure 1:
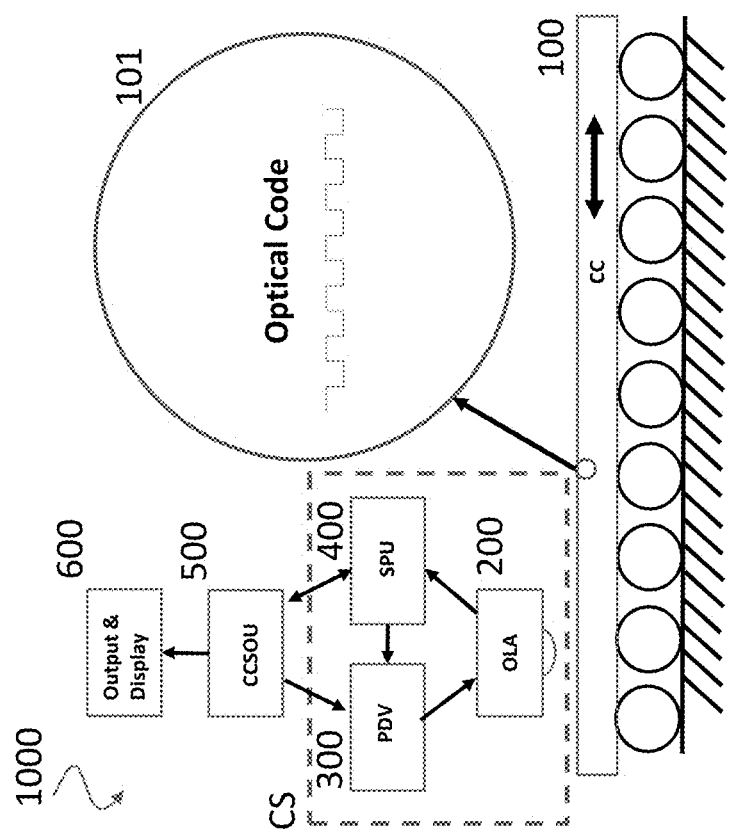
FIG. 1 is an exemplary diagram illustrating a displacement measurement system including a code carrier (CC), an optical laser assembly (OLA), a signal processing unit (SPU), a power driver (PDV), a central control and a signal output unit (CCSOU), and an output and display unit.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature(s), advantage(s) or mode(s) of operation(s).

Various exemplary embodiments will now be described in detail with reference to the drawings. It should be noted that the relative arrangement of the components and steps, numerical expressions and numerical values set forth in the embodiments are not intended to limit the scope of the invention unless otherwise specified.

Techniques, methods and apparatus known to those of ordinary skill in the relevant art may not be discussed in detail, but those techniques, methods and apparatus should be considered as part of the specification, where appropriate.

In all of the examples shown and discussed herein, any specific values are to be construed as illustrative only and not as a limitation. Thus, other examples of the exemplary embodiments may have different values.

It should be noted that similar reference numerals and letters indicate similar items in the following figures, and therefore, once an item is defined in one figure, it is not required to be further discussed in the subsequent figures.

Generally referring to FIGS. 1-10, exemplary embodiments described herein may measure linear or angular displacement (or position) based on the principle of laser optical interference of grating reflection, as opposed to existing technologies which are based on LED light mask-diffraction interference. The exemplary embodiments demonstrate methods which may differ from existing optical grating techniques due to the lack of diffraction grating involved and may be superior to optical data storage application because of the well-defined code channels and other technologies developed.

In a first exemplary embodiment shown in FIG. 1, a displacement measurement system 1000 includes of a code carrier 100, an optical laser assembly 200, a signal processing unit 400, a power driver 300, and a central control and signal output unit (CCSOU) 500. The output 600 of the system 1000 can be used by an external system for position or velocity control. The code carrier 100 is movable with respect to a reference system. The optical laser assembly 200, the signal processing unit 400, the power driver 300, and the CCSOU 500 may all be fixed on to the reference system. Alternatively, the code carrier may be fixed on to the reference system, while the optical laser assembly is movable with respect to the reference system.

The code carrier 100 may include position code channels 101 which may be decoded using optical or magnetic sensors. Further the code channels can be defined by an alternating geometric topography or an alternating material property, as desired.

Figure 2:
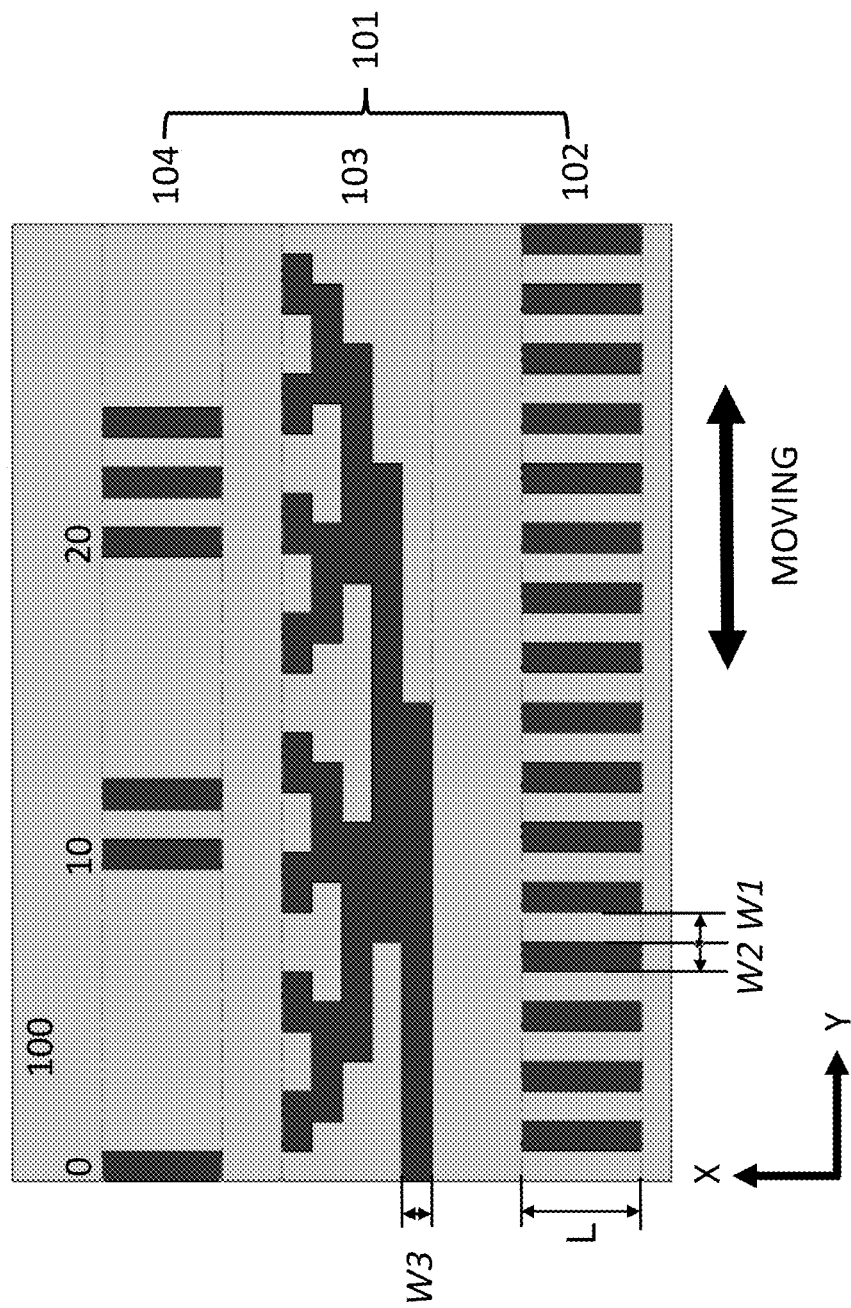
FIG. 2 is an exemplary diagram of a code carrier for linear displacement measurement.

Referring now to exemplary FIG. 2, FIG. 2 shows an exemplary embodiment of code carrier for a linear displacement measurement system. The code carrier 100 may be formed from an optical data-storage medium made of polymeric materials, such as, but not limited to, polycarbonate. Within the medium, the code carrier 100 may further include a relative displacement measurement code channel (RDMCC) 102. The RDMCC may be constructed with a continuous arrangement of pit lines and such formed bump lines. The pit lines and bump lines may be uniformly and alternatively distributed along the Y axis, the moving direction. The pit lines may have an approximately uniform depth which may be within a range between about 50 and about 200 nanometers. The width of the bump lines (W1) and width of the pit lines (W2) may be equal or unequal to each other depending upon specific applications. In an exemplary embodiment, the width of the bump lines may be five times larger than the width of the pit lines. It may be contemplated that any ratio of widths may be chosen, depending on the application. The widths of pit lines and bump lines may be within a range between 100 nanometers and 100 micrometers. The length (L) of the pit lines may be at least double their width.

Still referring to exemplary FIG. 2, the code carrier 100 may further include of an absolute displacement measurement code channel (ADMCC) 103. The ADMCC may include pit lines which may form at least one type of binary code, such as the Gray code. Pit lines may be distributed with their width along a line in the X direction, the scanning direction. The width (W3) and depth of the pit lines of the ADMCC 103 may be the same as the width and depth of the pit lines of the RDMCC 102.

Still referring to exemplary FIG. 2, a code carrier 100 may further include an absolute position reference code channel (APRCC) 104. The APRCC 104 may be at least one pit line or one missing pit line which is uniquely distributed among its neighboring pit lines and bump lines along the channel. The pit lines can be distributed with their width along the Y-axis, the moving direction. The depth, width and length of the pit lines of the APRCC 104 may be same as the depth, width, and length of the pit lines of the RDMCC 102. In this exemplary embodiment, there are three absolute position references which are labeled as 0, 10 and 20, the units of which may be varied depending on the displacement calculation and the specific implementation.

In an exemplary embodiment, the optical data-storage medium may be formed from polymeric materials, such as, but not limited to, polycarbonate. Bump lines and pit lines may be formed by compression stamping techniques or imprint lithography. Other transparent materials such as glass may also be used as the optical data-storage medium. Bump lines and pit lines may be formed by other techniques such as optical etching or any other known technique, as desired. The bump lines and pit lines within the code carrier 100 may be covered with a layer of reflective coating which may ensure proper, clear reflectivity. The reflective coating may be protected by a layer of polymeric material.

Figure 3:
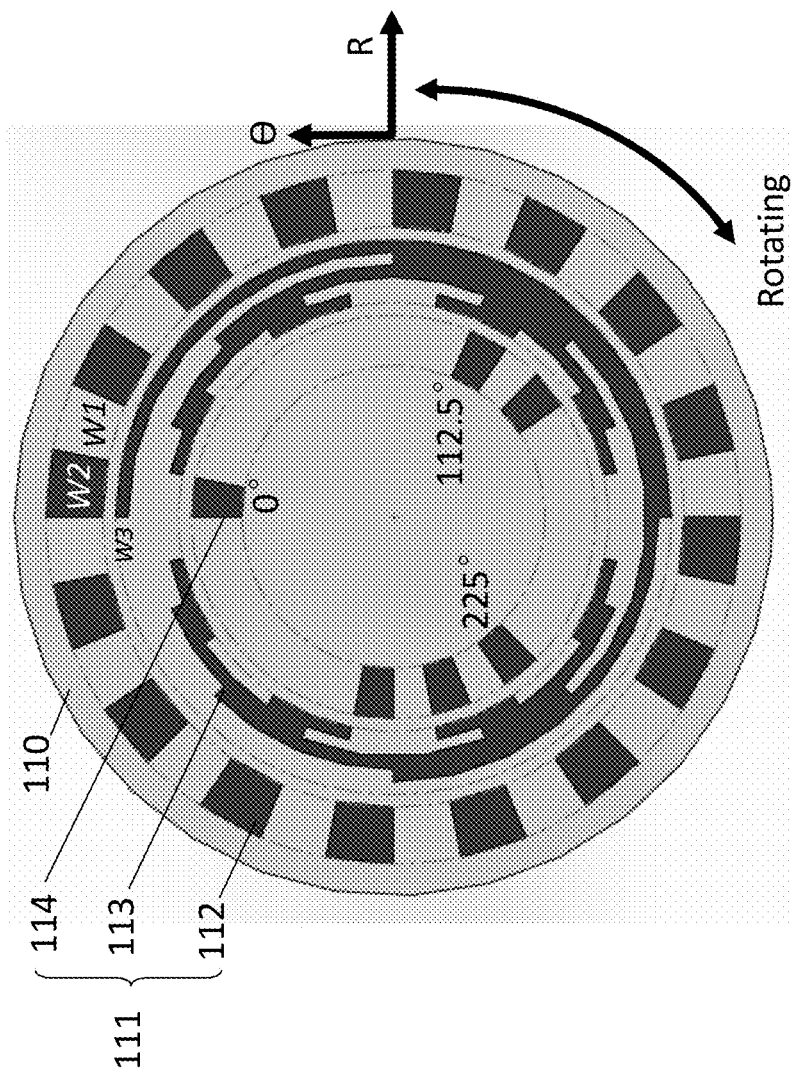
FIG. 3 is an exemplary diagram of a code carrier for angular displacement measurement.

Referring now to exemplary FIG. 3, FIG. 3 shows an exemplary code carrier of an angular displacement measurement system. The code carrier 110 in this exemplary embodiment may be a round-shaped. The optical data-storage medium may be made of polymeric materials, such as polycarbonate, or another material, as desired. Within the medium, the code carrier 110 may further include a relative displacement measurement code channel (RDMCC) 112. The RDMCC may be formed with a continuous arrangement of bump lines and pit lines. The bump lines and pit lines may be interspersed uniformly with their width along the circumferential direction (Θ). The depth of the pit lines may be approximately uniform, within a range between about 50 and about 200 nanometers. The width of the bump lines (W1) and width of the pit lines (W2) may be equal or unequal to each other depending upon specific applications. The widths may be within a range between about 100 nanometers and about 100 micrometers. The length of the pit lines (L) may be greater than double the width of the pit lines and is in the radius direction (R).

Still referring to exemplary FIG. 3, the code carrier may further include an absolute displacement measurement code channel (ADMCC) 113. The ADMCC may have at least one type of binary code. In an exemplary embodiment, Gray code is used. The pit lines can be distributed with their width (W3) along the radial axis (R). The depth and width of the pit lines of the ADMCC 113 may be equal to the depth and width of the pit lines of the RDMCC 112.

Still referring to FIG. 3, the code carrier 110 may further include an absolute position reference code channel (APRCC) 114. The APRCC may have at least one pit line or missing one pit lines which is uniquely distributed among neighboring bump lines or pit lines. The pit lines may be distributed with their width along the θ direction. The depth, width and length of the pit lines of the APRCC 114 may be equal to the depth, width, and length of the pit lines of RDMCC 112. This exemplary embodiment has three absolute position references at 0°, 112.5°, and 225°.

Figure 4A:
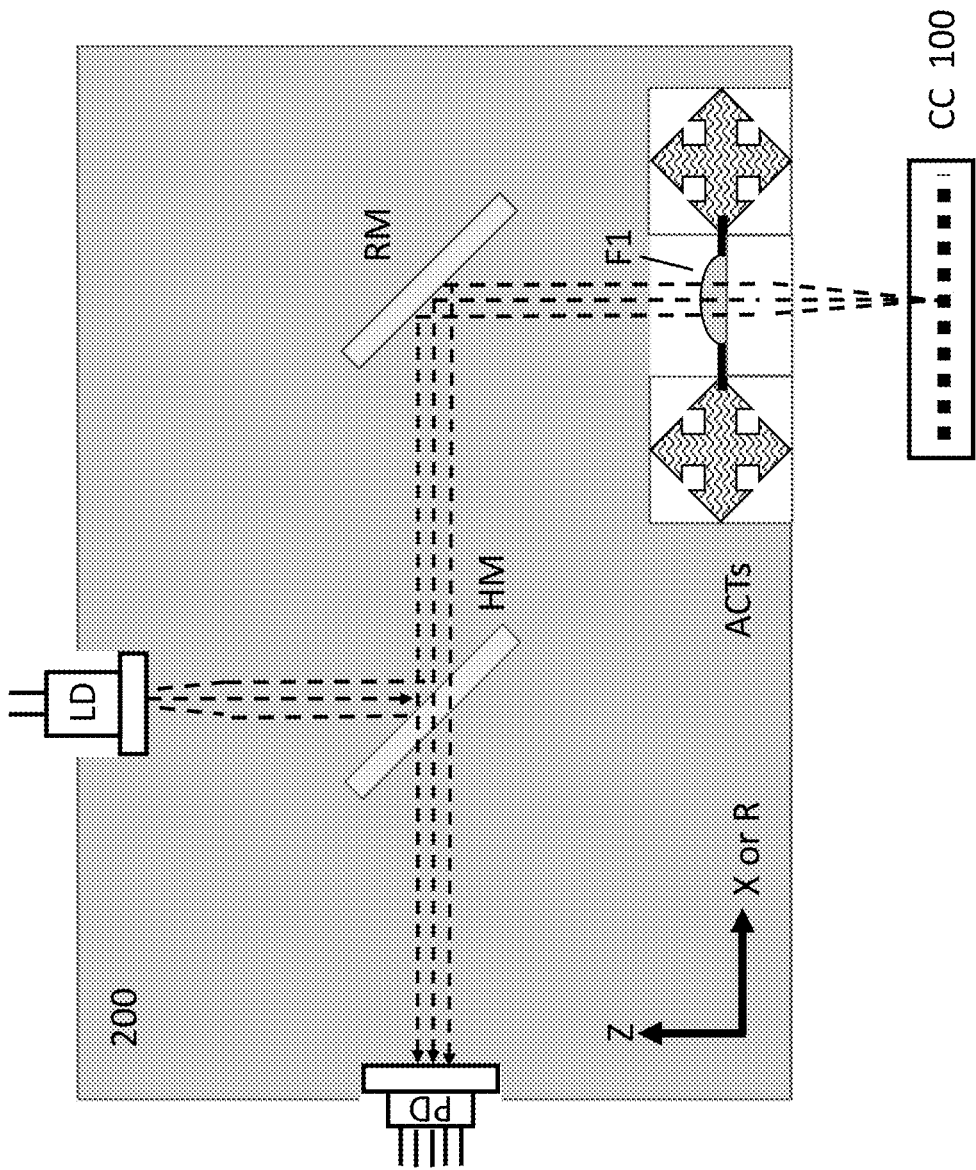
FIG. 4a is an exemplary side view of an optical laser assembly.
Figure 4B:
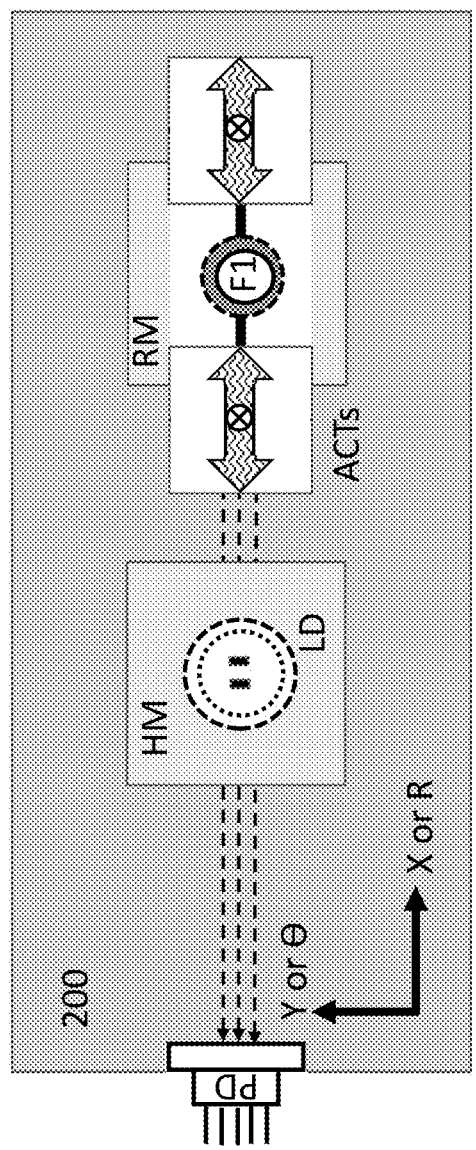

Referring now to exemplary FIGS. 4a and 4b, an optical laser assembly (OLA) 200 is illustrated. An exemplary optical laser assembly 200 can include a laser diode (LD), optical lenses including an objective lens (F1), coil actuators (ACTs), and a photo detector (PD). The optical laser assembly senses light reflected from the bump lines and pit lines in the RDMCC and may generate corresponding electronic signals. The signals may be processed to form a group of radio frequency (RF) signals that provide relative displacement measurement information when there is relative motion between the code carrier and the optical laser assembly.

The laser diode 202 in the optical laser assembly 200 may be capable of emitting laser beams with wavelengths of approximately 780 nm, 650 nm, and/or 405 nm. The laser diode may emit the laser beams of different wavelengths individually or, in a further embodiment, emit three laser beams of three different wavelengths simultaneously, as desired.

Still referring to exemplary FIG. 4, the optical laser assembly 200 may further include other lenses or mirrors in addition to the autofocusing lens (F1). These lenses or mirrors may make the laser beam emitted by the laser diode onto the code channel within the code carrier 100 and the laser beam reflected from the code channel back onto the photo detector.

The photo detector may have multiple light-sensitive elements. The elements may be arranged into four-quadrants. Each element may sense light, and may be arranged to sense light from the bump lines and pit lines of the RDMCC. The light sensed from the RDMCC may form multiple electrical signals. Thus, elements in each quadrant may sense different parts of bump lines and pit lines, and thus each quadrant or element may be associated with different signals. In an exemplary embodiment, electrical signals from quadrants that are diagonal from one another may be added together, and then those added signals may be subtracted from one another. For example, if quadrants 1-4 correspond to the variables a-d, and G1 is a parameter based on the electrical signals, the function $G1*(a+c)-(b+d)$ may be used to generate a control signal for the purpose of autofocusing. The optimal focused position may be found where the function approaches zero. The parameter, G1, may depend on the parameters of the photo detector and is variable based on conditions and hardware.

Figure 5:
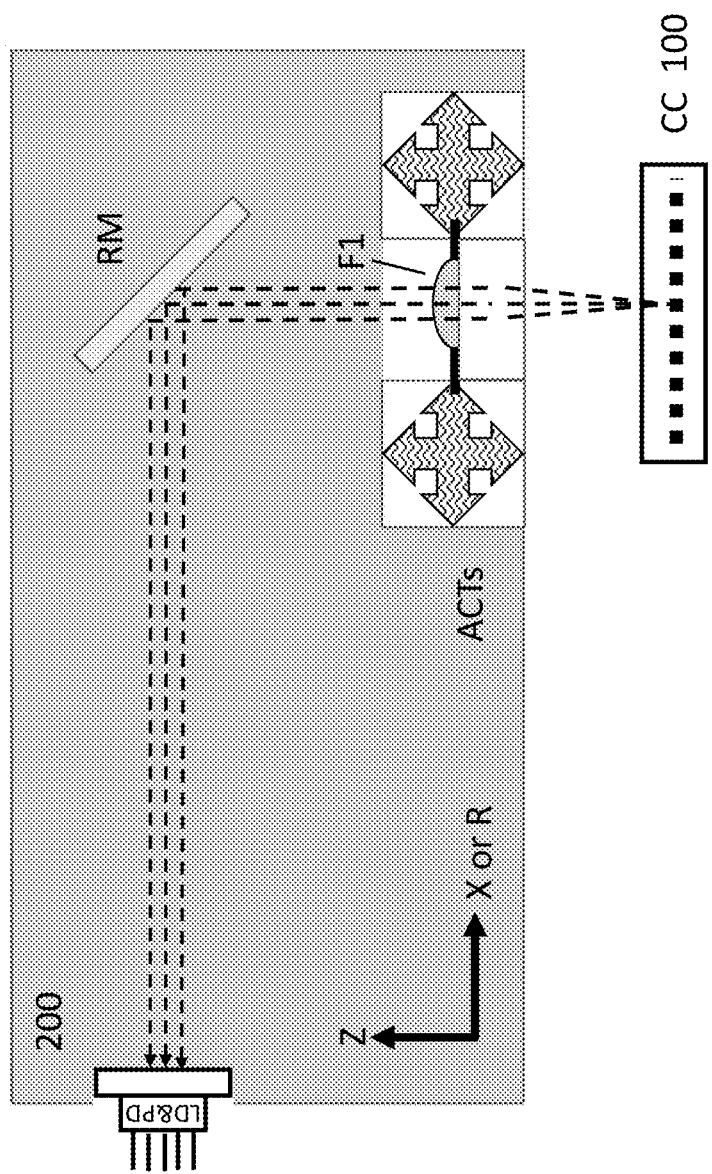
FIG. 5 is an exemplary top view of an optical laser assembly.

The laser diode and photo detector in the optical laser assembly 200 may be two individual components, or, in an alternative embodiment, they may be combined into a single multi-functional unit as shown in exemplary FIG. 5. In this way, the structure of the OLA can be simplified, and the size of OLA can be reduced.

Referring back to exemplary FIG. 1, the signal processing unit (SPU) 400 may pick up the electronic signals and may further process them into a focusing error signal. This error signal may prompt the SPU to signal the power driver (PDV) 300 to activate the ACTs which then drive or position the lens F1 in the OLA to accomplish auto-focusing. The group of RF signals from OLA may be picked up and interpreted by the SPU and may be transferred to the CCSOU 500. These signals may then be converted into another format for outputting displacement or velocity information. The SPU may be a single electronic chip or a circuit board of multiple components.

Referring to the figures generally, and specifically to FIG. 1, FIG. 4, and FIG. 5, a power driver may be required to receive control signals to power the 2-D ACTs in the optical laser assembly. The control signals may move the autofocusing lens F1 along the Z-axis (causing the lens to move closer or farther above the code carrier), until the lens is properly focused. The lens F1 may also be adjusted by the ACTs so that the optical focusing center is directly on the measurement code channel. The PDV may also receive control signals to power the 2-D ACTs in the optical laser assembly to make the lens F1 move in the X or R axis in order to reposition the laser's location to read a different code channel, or to perform a scan to obtain absolute position information.

Referring now to exemplary FIG. 6, a composite subsystem (CS) may be formed by an optical laser assembly, signal processing unit and a power driver. Multiple composite subsystems (CS1, CS1, CSn) may be used collaboratively to increase functionalities and improve the reliability and accuracy of the measurement system. The additional composite subsystems may confirm scanned or measured information, ensuring that the signal is accurate.

Still referring to FIG. 6, the code carrier may be movable with respect to a reference system. The composite subsystems and the CCSOU may be fixed on to the reference system. The CCSOU may send or receive control signals to or from the composite subsystems. Additionally, the CCSOU may calculate the displacement and velocity signals based on the reports from the composite subsystems and may export the displacement signal or velocity signal to an external device.

Figure 7A:
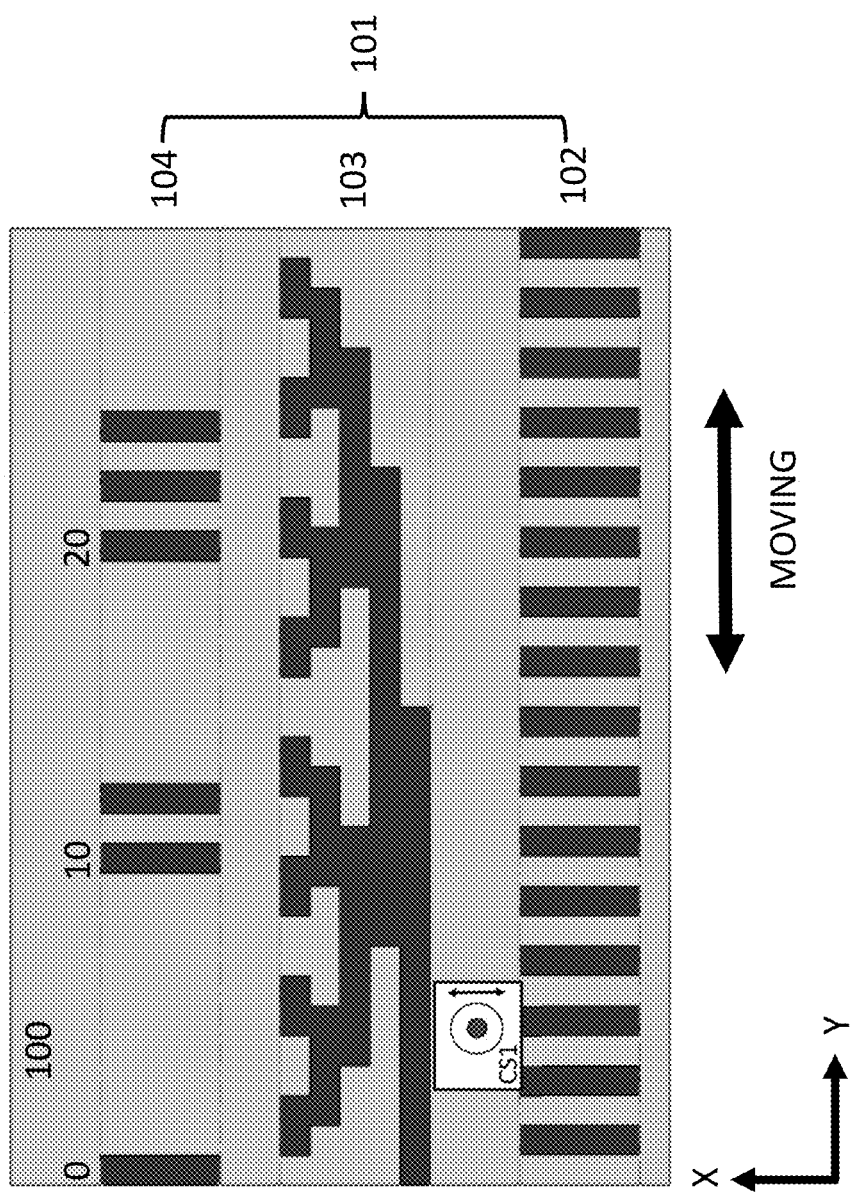
FIG. 7a is an exemplary diagram of a code carrier with a single CS.
Figure 7B:
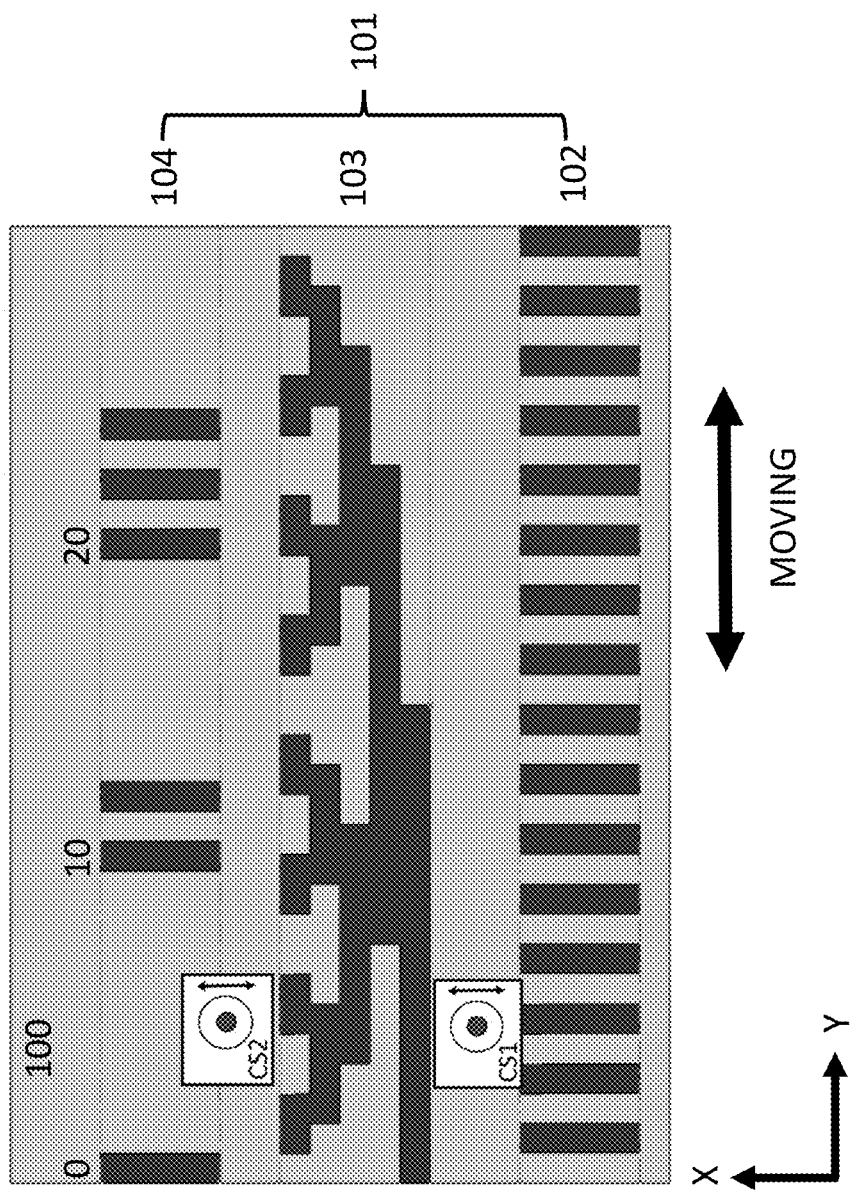
FIG. 7b is an exemplary diagram of a code carrier with two CSs.
Figure 7C:
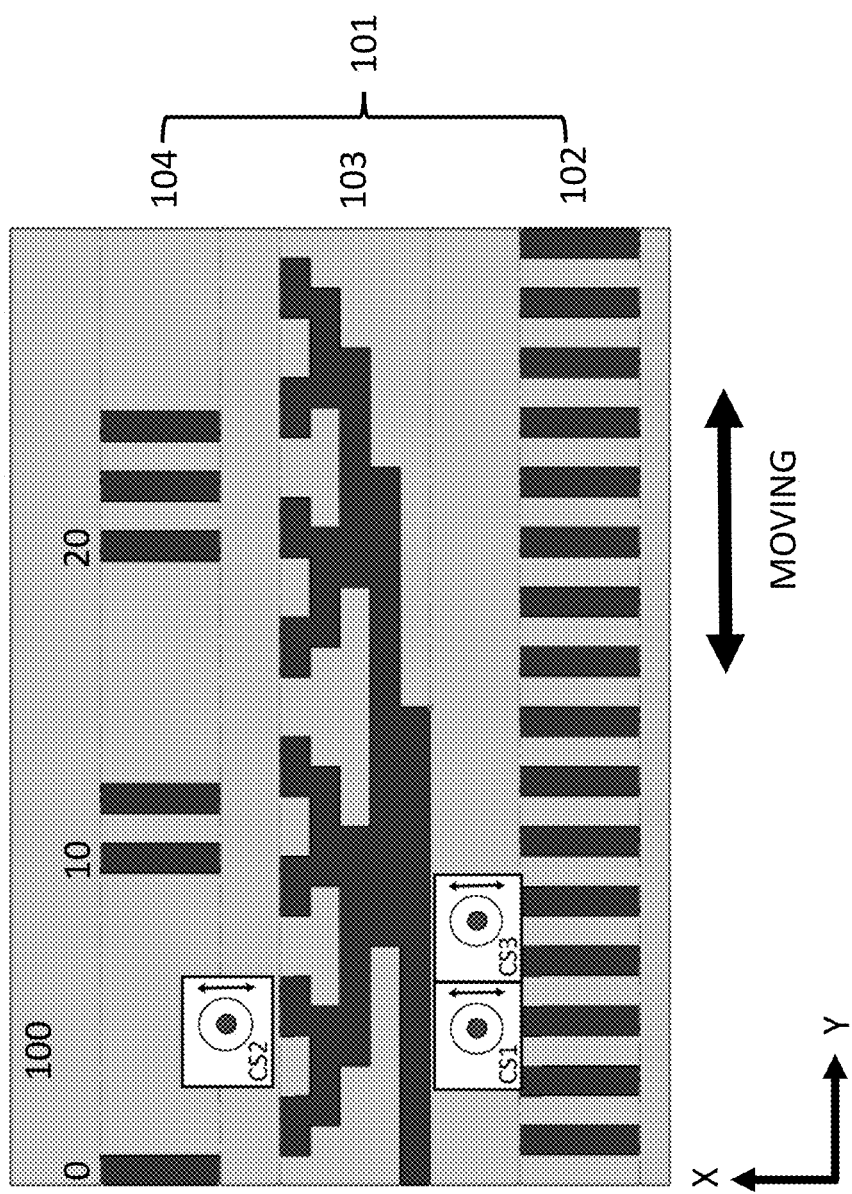
FIG. 7c is an exemplary diagram of a code carrier with three CSs.

Referring now to exemplary FIG. 7a-7c, FIG. 7a illustrates an exemplary embodiment for a linear displacement measurement device with a single composite subsystem CS1. When there is a relative motion between the code carrier and the composite subsystem CS1 in the Y direction, the ACTs in the OLA of the composite subsystem CS1 may drive the lens F1 to focus the laser beam on the RDMCC 102 of the code carrier to sense the bump lines and pit lines. The sequence of bump lines and pit lines is used to generate the first group of RF signals. These signals may be transferred to the CCSOU 500 and may be used alone to calculate the incremental displacement. At the beginning or at the end, when there is no relative motion between the code carrier and the composite subsystem CS1, the ACTs may drive the lens F1 to use the laser beam to scan the bump lines and pit lines of the ADMCC along the X axis to generate a second group of RF signals. This second group of RF signals can be transferred to the CCSOU 500 and used alone to calculate the single absolute position of the current position. Combining the information from the $1^{st}$ and $2^{nd}$ groups of RF signals, the CCSOU 500 can determine all absolute displacements or position with respect to the reference system.

FIG. 7b illustrates an exemplary embodiment for a linear displacement measurement device with two composite subsystems, CS1 and CS2. When there is a relative motion between the code carrier and the two composite subsystems along the Y-axis, the ACTs in the OLA of composite subsystem CS1 drives the lens F1 in CS1 to focus the laser beam on the RDMCC 102 of the code carrier 100 to sense the bump lines and pit lines to generate the first group of RF signals. These first signals can be transferred to the CCSOU 500 and used alone to calculate the incremental displacement. At the same time, the ACTs in the OLA of the second composite subsystem CS2 drives its lens F1 to focus the laser beam on the APRCC 104 of the code carrier 100 to sense the bump lines and pit lines to generate the third group of RF signals. This third group of RF signals may then be transferred to the CCSOU 500 and used alone to determine several individual absolute positions during the motion. Combining the information from the $1^{st}$ and $3^{rd}$ groups of RF signals, a device may determine all absolute displacements or position with respect to the reference system. When there is no relative motion between the code carrier and the two composite subsystems, the ACTs in both CS1 and CS2 may scan the bump lines and pit lines of the ADMCC 103 along the X-axis to generate the second and fourth groups of RF signals. These two signals may be transferred to the CCSOU 500 and used to calculate the single absolute position of the current position. In addition, the $3^{rd}$ RF signal can also be used to determine the moving direction of the code carrier.

FIG. 7c illustrates an exemplary embodiment for a linear displacement measurement device with three composite subsystems CS1, CS2, and CS3. The third composite subsystem CS3 may have the same functionalities as the CS1 described above, but may be located in a specific location, as needed. When there is a relative motion between the code carrier and the composite subsystem in the Y direction, the first and third composite subsystems may read the RDMCC 102 of the code carrier 100 to generate the first and fifth groups of RF signals. The composite subsystems CS1 and CS3 may be configured to have their relative phases of electrical signals offset by approximately ¼ of a period for one direction of motion, and approximately ¾ of the period for another direction of motion. These two groups of signals may be transferred to the CCSOU 500 and may be used to determine the movement direction of the code carrier 100. These two groups of signals may also be used together to intelligently determine the incremental displacement, and to increase sensitivity and reliability of measurement.

Figure 8:
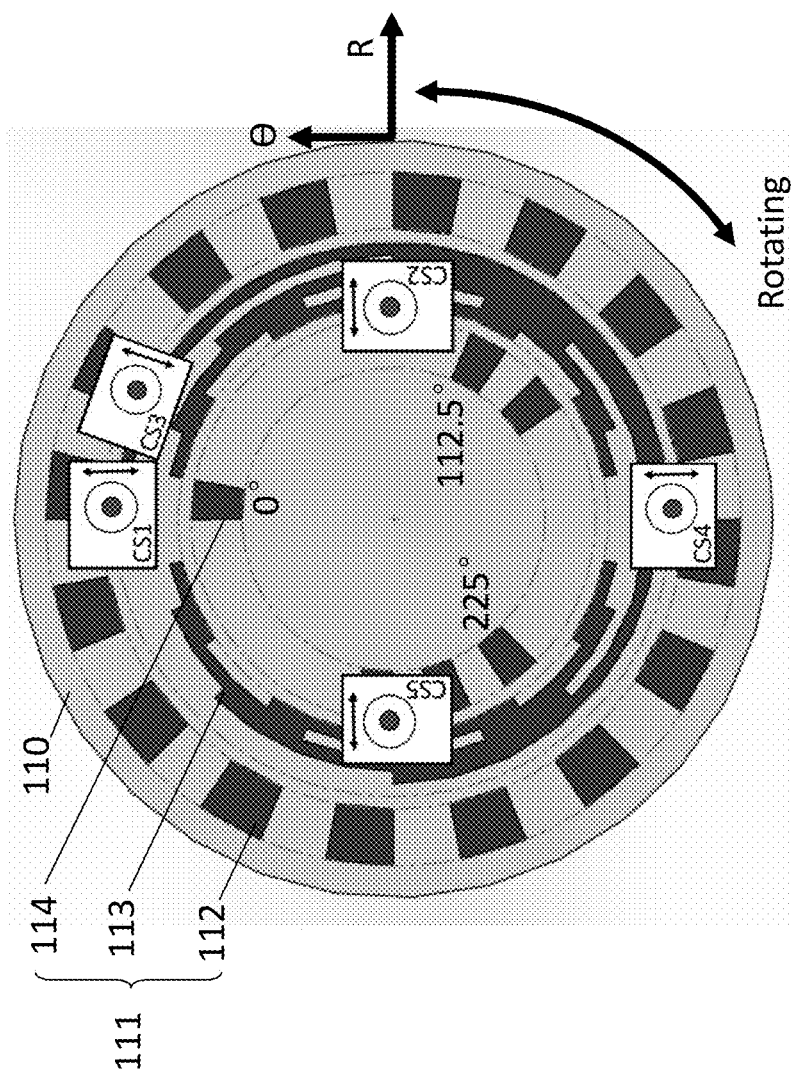
FIG. 8 is an exemplary diagram of a code carrier with five CSs.

FIG. 8 illustrates an exemplary embodiment for an angular displacement measurement device with multiple composite subsystems. In this embodiment, five composite subsystems, CS1, CS2, CS3, CS4, and CS5, are shown and described. An alternate embodiment may include a single composite subsystem, or different combinations of multiple composite subsystems. When relative motion between the code carrier and the composite subsystems is detected in the θ direction, the composite subsystems CS1, CS3, and CS4 may be used to read the RDMCC 112 of the code carrier 110 to generate the $1^{st}$, $3^{rd}$ and $4^{th}$ groups of RF signals. These three RF signals can be transferred to the CCSOU 500 and may be processed, such as with artificial intelligence, to more accurately and reliably determine the incremental displacement. When there is no relative motion between the code carrier and composite subsystems, the ADMCC 113 may be scanned along the R-axis by these three composite subsystems to generate the $6^{th}$, $8^{th}$ and $9^{th}$ groups of RF signals. These three RF signals can be transferred to the CCSOU 500 and processed, such as with artificial intelligence, to more accurately and reliably determine the current absolute position. Combining the information from the above signals, one can determine all absolute displacements or positions with respect to the reference system.

Still referring to FIG. 8, when relative motion is detected between the code carrier 110 and the composite subsystems in the θ direction, the composite subsystems CS2 and CS5 may be used to read the APRCC 104 of the code carrier 110 to generate the $2^{nd}$ and $5^{th}$ groups of RF signals. These two RF signals can be transferred to the CCSOU 500 and processed, such as with artificial intelligence, to determine several absolute positions during the motion. The information from the above two measurements along with the information from the $1^{st}$, $3^{rd}$ and $4^{th}$ incremental measurements can be processed, such as with artificial intelligence, to determine all absolute displacements or position with respect to the reference system. In addition, the two groups of RF signals from CS2 and CS5 may also be used to determine the rotating direction of the code carrier. The rotating direction of the code carrier may also be determined from other composite subsystems, such as composite subsystems CS1 and CS3, when they are set up to have their relative phases of electrical signals offset by approximately ¼ of a period for one direction rotation, and by approximately ¾ of the period for another direction rotation.

Figure 9:
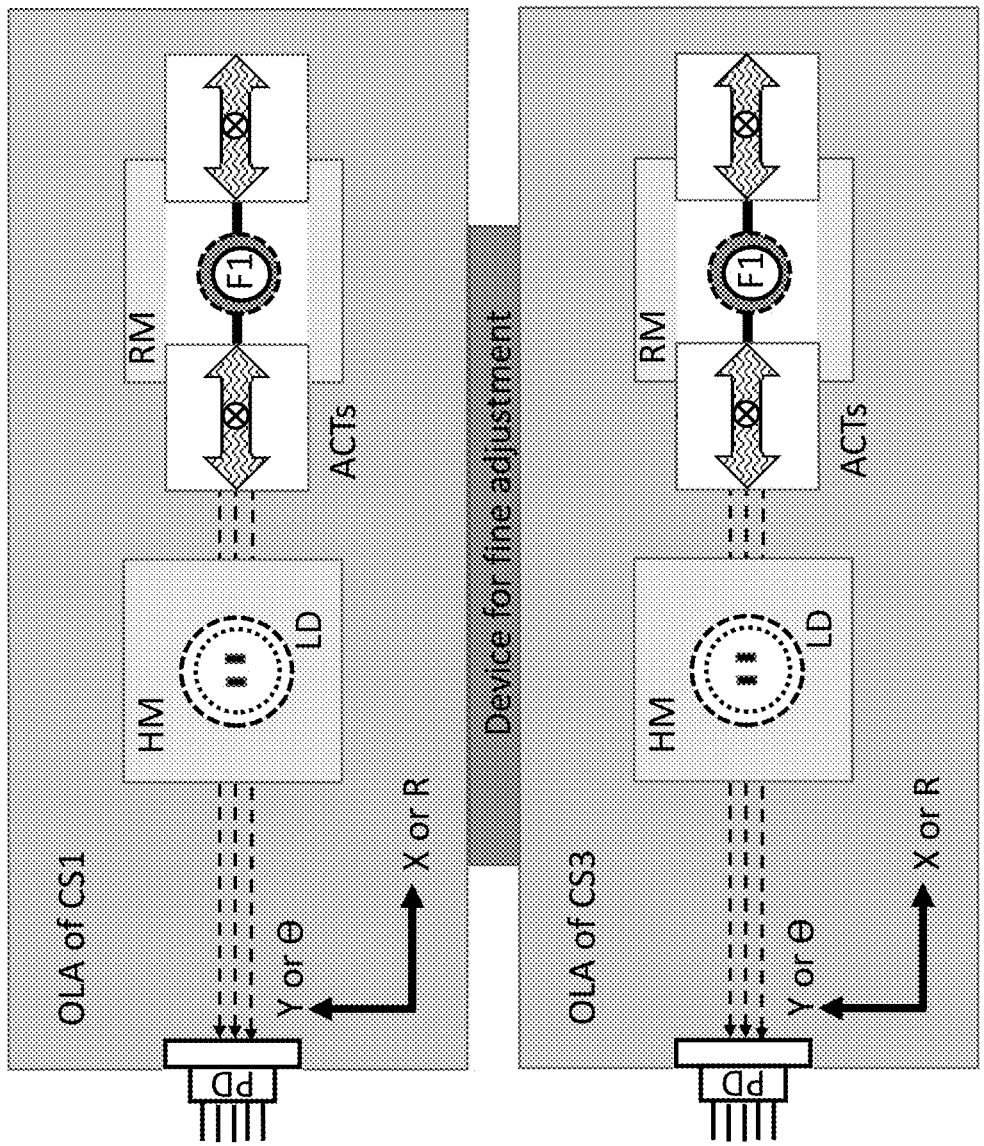
FIG. 9 is an exemplary diagram of two OLAs joined together by a device for fine adjustment.

Referring now to exemplary FIG. 9, a device is shown that may be used to make a fine adjustment of the relative offset of two composite subsystems, CS1 and CS3. The device may be inserted between the two optical laser assemblies of the CS1 and CS3, to finely adjust the distance in the Y or θ direction and between the OLAs. This device may be a mechanical component or may be a piezo-electric actuator.

Figure 10A:
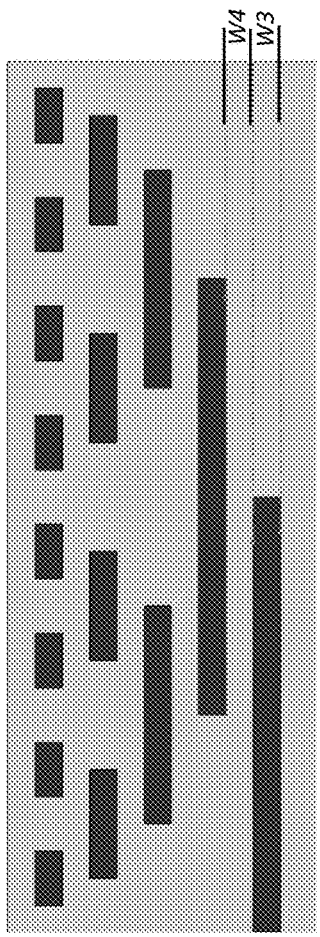
FIG. 10a is an exemplary diagram of a 5-bit Gray code separated by inserting referent bump lines.
Figure 10B:
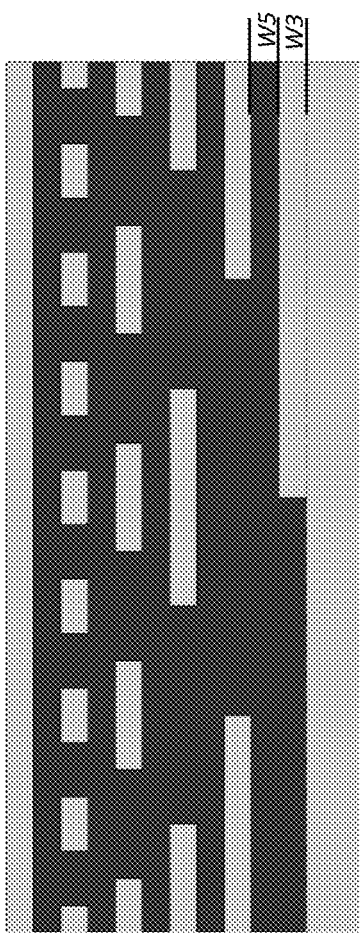
FIG. 10b is an exemplary diagram of a 5-bit Gray code separated by inserting referent pit lines.
Figure 10C:
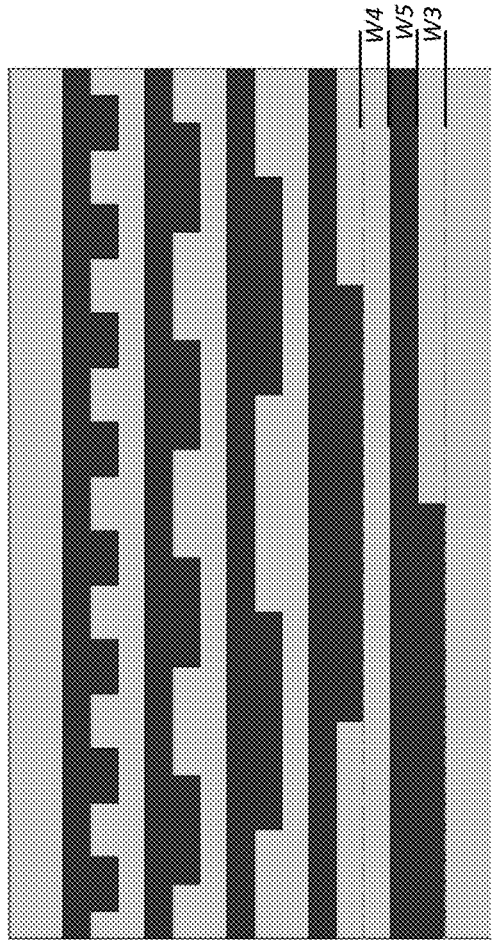
FIG. 10c is an exemplary diagram of a 5-bit Gray code separated by inserting both referent bump lines and pit lines.

The binary codes of the ADMCC 103, as illustrated in FIG. 3, may be further separated by inserting referent bump lines or/and pit lines. FIG. 10a shows an exemplary embodiment of a 5-bit Gray code separated by inserting referent bump lines. The width of the referent bump lines (W4) may be equal or unequal to the width of the Gray code (W3). FIG. 10b shows an exemplary embodiment of a 5-bit Gray code separated by inserting referent pit lines. The width of the referent pit lines (W5) may be equal or unequal to the width of the Gray code (W3). FIG. 10c shows an exemplary embodiment of a 5-bit Gray code separated by inserting both of referent bump lines and pit lines. The width of the referent bump lines (W4) and the width of the referent pit lines (W5) can be equal or unequal to the width of the Gray code (W3). The width of the referent bump lines (W4) and the width of the referent pit lines (W5) may be equal or unequal.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A displacement measurement system comprising:
a code carrier comprising:
a data storage medium and, within the data storage medium, an absolute position reference code channel (APRCC) comprising at least one pit line or one missing pit line, which is uniquely distributed among one or more neighboring pit lines, and a relative displacement measurement code channel (RDMCC) comprising an arrangement of one or more pit lines in a circumferential direction and one or more bump lines;
a first composite subsystem comprising:
an optical laser assembly (OLA) comprising a first 2-D coil actuator that is configured to:
drive an objective lens of the OLA to a position on top of the APRCC to read a first group of RF signals for the absolute position reference,
focus a laser beam on the one or more bump lines and the one or more pit lines in a direction perpendicular to a surface of the data storage medium, and
decode, with a photo detector, the laser beam reflected off the one or more bump lines and the one or more pit lines in the APRCC to generate a plurality of electronic signals and to obtain relative displacement reference information; and
drive the objective lens of the OLA to a position on top of the RDMCC to read a second group of RF signals for an incremental displacement measurement;
a first signal processing unit;
a first power driver, which is configured to control the first 2-D coil actuator to focus or reposition the laser beam; and
a central control and signal output unit (CCSOU).

2. The displacement measurement system as in claim 1, the OLA further comprising:
a laser diode configured to generate the laser beam;
at least one objective lens; and
a photo detector with a plurality of light-sensitive elements.

3. The displacement measurement system as in claim 2, wherein the laser diode of the OLA is configured to emit a laser beam with a wavelength of at least one of around 780 nm, 650 nm, or 405 nm.

4. The displacement measurement system as in claim 2, wherein the optical laser assembly further comprises:
a plurality of additional lenses in addition to the at least one objective lens, wherein the plurality of additional lenses is configured to:
intensify the laser beam emitted by the laser diode onto the code channel within the code carrier and
intensify the laser beam reflected from the code channel onto the photo detector.

5. The displacement measurement system as in claim 2, wherein the laser diode, the at least one objective lens, the first 2-D coil actuator, and the photo detector are combined into one single multi-functional unit.

6. The displacement measuring system of claim 2, wherein the first signal processing unit is configured to:
generate a control signal to the power driver to position the at least one objective lens for auto-focusing.

7. The displacement measurement system of claim 1, wherein the CCSOU is configured to determine an absolute displacement from the absolute position information of the second group of RF signals and the relative displacement measurement information of the first group of RF signals.

8. The displacement measurement system as in claim 1, wherein the code carrier further comprises an absolute displacement measurement code channel (ADMCC) having one or more pit lines in a radial direction to form a binary code, which is uniquely distributed among one or more neighboring pit lines, and further comprising
a second composite subsystem, comprising:
a second signal processing unit; and
a second power driver, which is configured to control the second 2-D coil actuator to focus or reposition the laser beam.

9. The displacement measurement system as in claim 8, wherein the CCSOU is configured to determine complete absolute displacement positions from the absolute position information of the third group of RF signals and the relative displacement measurement information of the first group of RF signals.

10. The displacement measurement system as in claim 1, wherein the depth of the pit lines is between 50 nm and 200 nm, the width of the pit lines and the bump lines is between 0.1 micrometer and 100 micrometers, and the length of pit lines is at least five times larger than the width of the pit lines.

11. The displacement measurement system as in claim 1, wherein the bump lines and pit lines on the code carrier are arranged to have their width along a straight axis of a moving direction for a linear displacement measurement and relative motion between the code carrier and OLA is accomplished by either moving the code carrier or the OLA.

12. The displacement measurement system as in claim 1, wherein the bump lines and pit lines on the code carrier are arranged to have their width along circumferential directions of movement for an angular displacement measurement.

13. The displacement measurement system as in claim 1, wherein the code carrier is made of polymeric materials and the bump lines and pit lines are formed by either compression stamping techniques or imprint lithography.

14. The displacement measurement system as in claim 1, wherein the bump lines and pit lines within the code carrier are covered with a reflective coating and the reflective coating is protected by a layer of polymeric material.

15. The displacement measurement system as in claim 1, wherein the first 2-D coil actuator further comprises:
a first actuator; and
a second actuator, wherein the first actuator is configured to move the lens along an axis to bring the lens closer or farther to the code carrier as needed to auto-focus the lens, and the second actuator is configured to move the laser beam in a direction parallel to the pit-length direction of the RDMCC to select a different measurement code channel.

16. The displacement measurement system as in claim 1, wherein the photo detector further comprises:
multiple photo-electric converting elements arranged in a four-quadrant arrangement that are configured to generate a plurality of electrical signals such that each of the four quadrants are labeled a-d, respectively, wherein the plurality of electrical signals from a pair of diagonal quadrants from the four-quadrant arrangement are added together and then subtracted from each other according to a function G1*(a+c)−(b+d) for the purpose of auto-focusing, and G1 is a parameter determined based on the plurality of electrical signals.

17. The displacement measurement system of claim 1, further comprising:
one or more additional composite subsystems, each additional composite subsystem comprising:
an additional OLA, wherein the additional OLA is configured to:
scan the bump lines and pit lines in the RDMCC to generate a plurality of corresponding electronic signals and the first group of RF signals and
scan the APRCC to generate the plurality of corresponding RF signals, wherein the CCSOU is configured to process the plurality of corresponding RF signals to obtain absolute position reference information;
an additional signal processing unit; and
an additional power driver configured to:
receive control signals from the additional signal processing unit
provide power to an additional 2-D coil actuator in the additional OLA to focus or reposition the laser, and
scan an ADMCC to obtain the absolute position information.

18. The displacement measurement system as in claim 1, further comprising one or more additional composite subsystems, wherein each additional composite subsystem comprises:
one or more optical laser assemblies (OLAs);
one or more signal processing units configured to receive electronic signals from the one or more OLAs; and
one or more additional power drivers; wherein the RDMCC is scanned and a control signal is generated therefrom, producing the first group of RF signals to obtain incremental displacement information, wherein a second composite subsystem comprises:
at least a second optical laser assembly;
at least a second signal processing unit which is configured to receive the electronic signals from the one or more OLAs; and
a device configured to perform fine adjustment of relative offset between the first composite subsystem and one of the other compositive subsystems.

19. The displacement measuring system as in claim 1, wherein the code carrier of the displacement measuring system is configured to be mounted on one of a moving part or a stationary part, and a composite subsystem is configured to be mounted on the other part.

20. The displacement measuring system of claim 1, wherein the data storage medium is an optical data storage medium.

21. The displacement measuring system of claim 1, wherein the CCSOU is configured to: command the first power driver to perform scans on an absolute displacement measurement code channel (ADMCC) to obtain the absolute position information.

22. The displacement measuring system of claim 1, wherein the CCSOU is configured to:
provide commands to and receive signals from other components; and
generate and export a plurality of displacement signals and velocity signals to an external device.

23. A displacement measuring system with a control loop formed with a code carrier, an optical laser assembly, a signal processing unit, and a power driver, wherein the code carrier comprises:
an optical data-storage medium,
an absolute position reference code channel (APRCC) comprising at least one pit line or one missing pit line, which is uniquely distributed among one or more neighboring pit lines, and
a relative displacement measurement code channel (RDMCC) consisting of a continuous alternating uniform arrangement of a plurality of pit lines in a circumferential direction with equal depth, wherein edges of the plurality of pit lines form a plurality of bump lines, wherein the optical laser assembly comprises:
a laser diode,
an objective lens,
a coil actuator configured to drive an objective lens of the OLA to a position on top of the APRCC to read a first group of RF signals for the absolute position reference, focus a laser beam on the one or more bump lines and the one or more pit lines in a direction perpendicular to a surface of the data storage medium, and decode, with a photo detector, the laser beam reflected off the one or more bump lines and the one or more pit lines in the APRCC to generate a plurality of electronic signals and to obtain relative displacement reference information, and drive the objective lens of the OLA to a position on top of the RDMCC to read a second group of RF signals for an incremental displacement measurement; and
a photo detector, the photo detector comprising multiple light-sensitive elements arranged in a four-quadrant arrangement, wherein the multiple light sensitive elements are configured to sense light from the plurality of bump lines and the plurality of pit lines of the RDMCC to generate a plurality of electrical signals, the plurality of electrical signals from diagonal quadrants of the four-quadrant arrangement are added together and then subtracted from each other according to a function G1*(a+c)−(b+d) to generate a control signal for the purpose of auto-focusing, G1 is a parameter determined based on the electrical signals, and the power driver is configured to receive the control signal to power the coil actuator in the optical laser assembly to drive the objective lens to accomplish auto focusing.

24. A method for determining a displacement measurement, comprising:
scanning a code carrier comprising an absolute position reference code channel (APRCC) comprising at least one pit line or one missing pit line, which is uniquely distributed among one or more neighboring pit lines, and a relative displacement measurement code channel (RDMCC) comprising an arrangement of one or more pit lines in a circumferential direction and one or more bump lines, using an optical laser assembly (OLA), by:
controlling at least one 2-D coil actuator with a power driver to adjust a position of an optical objective lens inside of the OLA, drive an objective lens of the OLA to a position on top of the APRCC to read a first group of RF signals for the absolute position reference, focus a laser beam on the one or more bump lines and the one or more pit lines in a direction perpendicular to a surface of the data storage medium, decode, with a photo detector, the laser beam reflected off the one or more bump lines and the one or more pit lines in the APRCC to generate a plurality of electronic signals and to obtain relative displacement reference information, and drive the objective lens of the OLA to a position on top of the RDMCC to read a second group of RF signals for an incremental displacement measurement;

emitting a laser beam using a laser diode onto the code carrier;

decoding the laser beam after it reflects off the code carrier using a signal processing unit to obtain a group of electric signals; and calculating the displacement and/or the velocity based on the obtained electric signals.

* * * * *